United States Patent
Lee et al.

(10) Patent No.: US 8,681,016 B2
(45) Date of Patent: Mar. 25, 2014

(54) DRIVER ASSISTANCE SYSTEM

(75) Inventors: Charles Lee, San Francisco, CA (US);
Jaime Camhi, Sunnyvale, CA (US);
Annie Lien, Palo Alto, CA (US); Marco Lobato, Palo Alto, CA (US)

(73) Assignee: Volkswagen AG, Wolfsburg (DE)

( * ) Notice: Subject to any disclaimer, the term of this patent is extended or adjusted under 35 U.S.C. 154(b) by 414 days.

(21) Appl. No.: 13/035,514

(22) Filed: Feb. 25, 2011

(65) Prior Publication Data
US 2012/0218124 A1 Aug. 30, 2012

(51) Int. Cl.
*G08G 1/00* (2006.01)
*B60Q 1/00* (2006.01)

(52) U.S. Cl.
USPC ........... 340/904; 340/903; 340/901; 340/436; 180/169; 180/170

(58) Field of Classification Search
USPC .................................. 340/904, 903
See application file for complete search history.

(56) References Cited

U.S. PATENT DOCUMENTS

| | | | | |
|---|---|---|---|---|
| 3,898,652 A | * | 8/1975 | Rashid | 342/59 |
| 5,959,552 A | * | 9/1999 | Cho | 340/903 |
| 2002/0072843 A1 | * | 6/2002 | Russell et al. | 701/96 |

* cited by examiner

*Primary Examiner* — Donnie Crosland
(74) *Attorney, Agent, or Firm* — Barnes & Thornburg LLP (57) ABSTRACT

A method for assisting a driver driving a vehicle, and a driver assistance system for assisting a driver driving a vehicle are described, wherein detection of a blind spot situation wherein another vehicle is located in a blind spot area of the driver's vehicle is performed, and information indicating that a blind spot situation is present is output to the driver.

21 Claims, 4 Drawing Sheets

DRIVER ASSISTANCE SYSTEM

BACKGROUND OF THE INVENTION

The present invention relates to a driver assistance system, especially a driver assistance system for assisting a driver driving a vehicle in a blind spot situation.

BRIEF SUMMARY OF THE INVENTION

According to an embodiment, a method for assisting a driver driving a first vehicle is provided. According to the method, it is detected if the first vehicle is located in a blind spot area of a second vehicle, and in case it is detected that the first vehicle is located in the blind spot area of the second vehicle, an information indicating that a blind spot situation is present is output to the driver of the first vehicle.

According to another embodiment, a method for assisting a driver driving a first vehicle is provided. The method comprises detecting if one vehicle of the first vehicle and a second vehicle is located in a blind spot area of the other vehicle of the first vehicle and the second vehicle. If it is detected that the one vehicle is located in the blind spot area of the other vehicle, a speed of the first vehicle is automatically varied and an information is output to the driver of the first vehicle. The information indicates that the speed of the first vehicle is varied due to a blind spot situation.

According to a further embodiment, a driver assistance system for assisting a driver of a first vehicle is provided. The system comprises a detecting unit, an output unit, and a processing unit. The detecting unit is configured to detect objects in a surrounding of the first vehicle. The output unit is configured to output information to the driver of the first vehicle. The processing unit is coupled to the detecting unit and the output unit. The processing unit is configured to detect if the first vehicle is located in a blind spot area of a second vehicle depending on the detected objects in the surrounding of the first vehicle. Furthermore, the processing unit is adapted to output an information indicating that a blind spot situation is present if it is detected that the first vehicle is located in the blind spot area of the second vehicle.

According to another embodiment, a driver assistance system for assisting a driver of a first vehicle is provided. The system comprises a detecting unit configured to detect objects in a surrounding of the first vehicle, an output unit configured to output information to the driver of the first vehicle, a speed control unit configured to control a speed of the first vehicle, and a processing unit coupled to the detecting unit, the output unit, and the speed control unit. The processing unit is configured to detect if one vehicle of the first vehicle and a second vehicle is located in a blind spot area of the other vehicle of the first vehicle and the second vehicle depending on the detected objects in the surrounding of the first vehicle. If the processing unit has detected that the one vehicle is located in the blind spot area of the other vehicle, the processing unit is configured to vary the speed of the first vehicle and to output an information indicating that the speed of the first vehicle is varied due to a blind spot situation.

According to yet another embodiment, a vehicle comprising the above-described driver assistance system is provided.

Although specific features described in the above summary and the following detailed description are described in connection with specific embodiments, it is to be understood that the features of the embodiments described can be combined with each other unless specifically noted otherwise.

BRIEF DESCRIPTION OF THE DRAWINGS

Hereinafter, exemplary embodiments of the invention will be described with reference to the drawings.

DETAILED DESCRIPTION OF THE INVENTION

In the following, exemplary embodiments of the invention will be described in more detail. It is to be understood that the following description is given only for the purpose of illustrating the principles of the invention and is not to be taken in a limiting sense. Rather, the scope of the invention is defined only by the appended claims and not intended to be limited by the exemplary embodiments hereinafter.

It has to be understood that in the following detailed description of the embodiments any direct connection or coupling between devices, components or other physical units shown in the drawings or described herein could also be implemented in an indirect connection or coupling. Same reference signs in the various instances of the drawings refer to similar or identical components. Furthermore, it is to be understood that the features of the various embodiments described herein may be combined with each other unless specifically noted otherwise.

Figure 1:
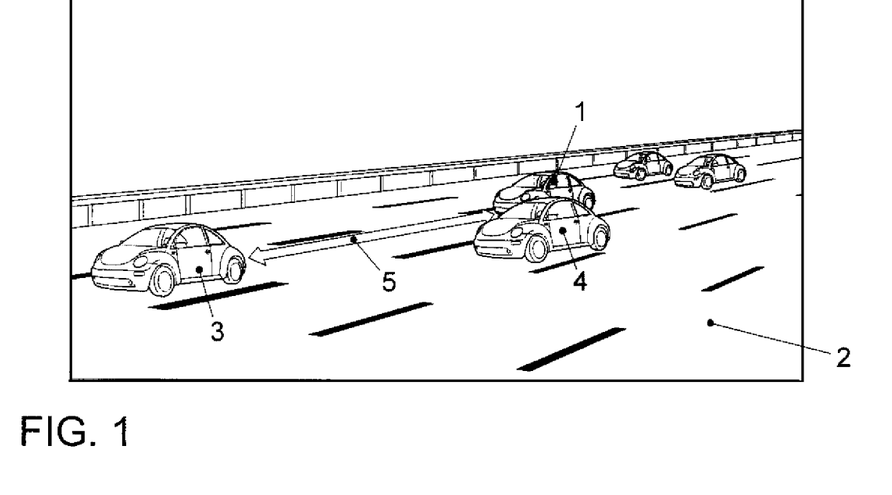
FIG. 1 shows schematically a road with vehicles involved in a blind spot situation.

Vehicles, for example automobiles or trucks, may provide a driver assistance system for supporting a driver driving the vehicle. The driver assistance system may comprise for example an adaptive cruise control system (ACC system) which may control the speed of the vehicle such that a distance to another vehicle driving in front of the vehicle is maintained constant or such that the vehicle is driving at constant speed. However, such adaptive cruise control systems may make lane change maneuvers dangerous for other drivers on the road as well as for the driver of the vehicle itself. For example, as shown in FIG. 1, a first vehicle 1 is driving under control of an adaptive cruise control system on a road 2. The adaptive cruise control system keeps a distance 5 between the first vehicle 1 and another vehicle 3 driving in front of the first vehicle 1 on a constant value. On a neighboring lane a second vehicle 4 is driving at nearly the same speed as the first vehicle 1. Thus, the first vehicle 1 may stay for a long time in a blind spot area of the second vehicle 4. When the driver of the second vehicle 4 wants to change the lane, the driver may not recognize the first vehicle 1 which may lead to a dangerous situation. Similarly, the adaptive cruise control system may keep a further vehicle in the blind spot of the first vehicle 1 as well. Both situations are dangerous and should be avoided.

Figure 2:
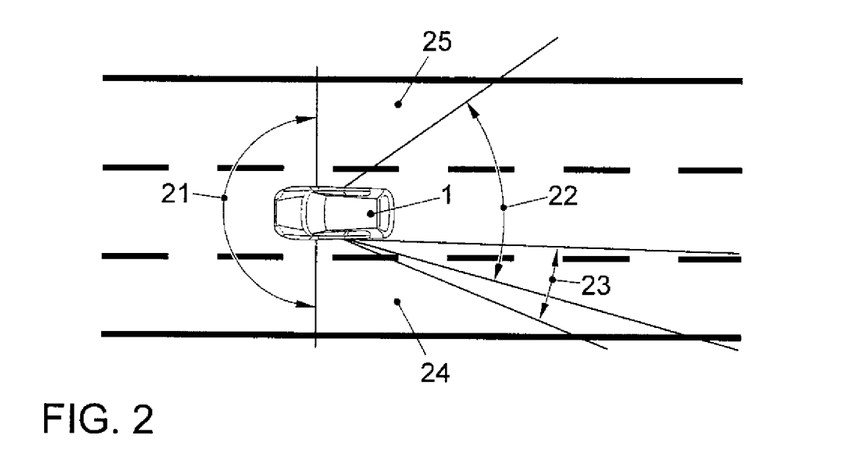
FIG. 2 shows schematically blind spot areas of a vehicle.

FIG. 2 shows a definition of the blind spot in a vehicle 1. A blind spot in a vehicle 1 are areas around the vehicle 1 that cannot be directly observed by the driver while looking forward or through either the rear view or side mirrors. A driver of the vehicle 1 can observe a forward area 21 by looking through the wind shield of the vehicle 1, a rear view area 22 by looking into the rear view mirror of the vehicle 1, and a side area 23 by looking into the side mirror of the vehicle 1. However, a blind spot area 24 cannot be directly observed without turning the head. The same applies for a blind spot area 25 at the co-driver's side of the vehicle 1.

According to an embodiment of the present invention, a method for assisting a driver driving a first vehicle is provided. According to the method it is detected if the first vehicle is located in a blind spot area of a second vehicle, and an information indicating that a blind spot situation is present is output to the driver of the first vehicle, if it is detected that the first vehicle is located in the blind spot area of the second vehicle. In this passive embodiment, utilizing for example a camera or an array of distance sensors, the driver of the first vehicle can be informed when the first vehicle is in the blind spot of the second vehicle. Then it is up to the driver to maneuver out of this area so that the first vehicle is not in the position of the blind spot area of the driver of the second vehicle. The driver of the first vehicle may be informed about this information by utilizing a light-based warning system which may be mounted on the side rear view mirror of the vehicle. In order to warn the driver that the first vehicle is located in the position of the blind spot area of the second vehicle, an array of light emitting diodes (LED), an instrument cluster display, or any other source of visual feedback may be used. For example, there may be a line or a column of light dedicated to the blind spot avoidance showing various stages of graduated light warning based on how close the first vehicle is getting into the position of the blind spot area of the second vehicle. Furthermore, the driver of the first vehicle may be informed about the blind spot situation via an audio-based warning system. This alert can be a simple ring or a simple voice command to inform the driver that the first vehicle is in the position of the blind spot area of the second vehicle.

According to another embodiment, a method for assisting a driver driving a first vehicle is provided. According to the method it is detected if one vehicle of the first vehicle and a second vehicle is located in a blind spot area of the other vehicle of the first vehicle and the second vehicle. This means, that it is detected if the first vehicle is located in the blind spot area of the second vehicle, or if the second vehicle is located in the blind spot area of the first vehicle. If it is detected that the one vehicle is located in the blind spot area of the other vehicle, a speed of the first vehicle is automatically varied and an information is output to the driver of the first vehicle. The information indicates that the speed of the first vehicle has been varied due to a detected blind spot situation. The speed of the first vehicle may be varied by controlling an adaptive cruise control system to speed up or to slow down the first vehicle or to increase or decrease a distance to a vehicle driving in front of the first vehicle. By controlling the adaptive cruise control system to modulate the speed of the first vehicle automatically it may be avoided that the first vehicle stays in the position of the blind spot area of the second vehicle, and/or that the second vehicle stays in the blind spot area of the first vehicle. In this so-called active embodiment, the driver of the first vehicle does not manually maneuver the first vehicle out of the dangerous situation. Rather, the adaptive cruise control system may automatically speed up or slow down the first vehicle out of the critical area.

According to an embodiment, a further information is output to the driver of the first vehicle if it is detected that the one vehicle is located in the blind spot area of the other vehicle. The further information indicates that the blind spot situation is present. Thus, the driver of the first vehicle may be informed about the fact that the first vehicle is involved in a blind spot situation with respect to another vehicle. This may cause the driver not to change the lane or to observe the other vehicle carefully before changing the lane.

According to another embodiment, an amount of time for which the blind spot situation is lasting is detected and the speed of the first vehicle is automatically varied only if the detected amount of time exceeds a predetermined amount of time. According to yet another embodiment, a speed difference between a speed of the one vehicle and a speed of the other vehicle is detected, and the speed of the first vehicle is automatically varied only if the detected speed difference is below a predetermined threshold value. This may avoid a constant acceleration and a deceleration of the first vehicle in situations like passing another vehicle on an adjacent lane or being passed by another vehicle on an adjacent lane.

According to a further embodiment, the speed of the first vehicle is automatically varied by accelerating the first vehicle with a predetermined amount of acceleration, or by decelerating the first vehicle with a predetermined amount of deceleration. The amount of acceleration and the amount of deceleration are different. Since the above-described method modulates the speed of the first vehicle, if the first vehicle is in the blind spot of the second vehicle, and also if a further vehicle is in the blind spot area of the first vehicle, there may be a possibility for conflicts if two vehicles use this method and get in each other's blind spot areas. By having different amounts of acceleration and deceleration this conflict can be resolved.

According to another embodiment, the one vehicle is the first vehicle and the other vehicle is the second vehicle. For detecting if the one vehicle is located in the blind spot area of the other vehicle, an area on a neighboring lane beside and in front of the first vehicle is monitored and it is detected, if a driver position of the second vehicle resides in a predetermined area on the neighboring lane beside and in front of the first vehicle. Thus, it may be determined, if the first vehicle is located in the blind spot area of the second vehicle and the driver of the first vehicle may be warned about this information or the adaptive cruise control may be controlled such that the first vehicle gets out of this dangerous situation. In this situation the driver of the second vehicle may not recognize the first vehicle and may therefore collide with the first vehicle when changing the lane.

According to another embodiment, the other vehicle is the first vehicle and the one vehicle is the second vehicle. For detecting, if the one vehicle is located in the blind spot area of the other vehicle, an area on a neighboring lane beside and behind the first vehicle is monitored and it is detected, if the second vehicle resides in a predetermined area on the neighboring lane beside and behind the first vehicle. If it is detected that the second vehicle resides in the predetermined area, the driver of the first vehicle may be warned that the second vehicle resides in the blind spot of the first vehicle. Furthermore, an adaptive cruise control system of the first vehicle may be controlled such that the first vehicle is maneuvered out of this situation to avoid a collision when the driver of the first vehicle changes the lane without noticing the second vehicle.

According to a further embodiment, a distance between a current position of the first vehicle and a blind spot position in which the first vehicle is located in the blind spot situation is detected, and an information indicating the detected distance is output to the driver of the first vehicle. The information indicating the distance warns the driver of the first vehicle that the first vehicle is getting closer to a dangerous blind spot situation. Thus the attention of the driver may be increased by this warning to avoid a collision in the blind spot situation.

According to yet another embodiment, the information indicating that the blind spot situation is present comprises an information selected from an audio signal, an optical signal and a tactile signal. Thus, the driver of the first vehicle may be reliably warned to increase attention of the driver.

According to another embodiment, detecting if the one vehicle is located in the blind spot area of the other vehicle is performed by detecting objects in a surrounding of the first vehicle with a detecting unit, and detecting if the one vehicle is located in the blind spot area of the other vehicle depending on the detected objects in the surrounding of the first vehicle. The detecting unit comprises for example a camera, a distance sensor, a radar device, a laser range finder, an ultra-sound distance sensor, an infrared distance finder, or a combination of the devices listed above. Some of these sensors may already be available in the first vehicle for other functions and can be used for the above-described method without extra costs. For example, a camera for a line departure warning system may also be utilized for determining if the one vehicle is located in the blind spot area of the other vehicle. Furthermore, there may be some sensor fusion between the camera and the ultra-sound distance sensor used for a parking assistance system to improve a detection of a position of the first vehicle with respect to objects and vehicles in neighboring lanes. Information about a relative position of the first vehicle with respect to other vehicles can be transmitted via a CAN bus to a control unit, for example a control unit of the adaptive cruise control system. The control unit may use the information from the CAN bus as part of its speed control algorithm.

According to another embodiment of the present invention, a driver assistance system for assisting a driver driving a first vehicle is provided. The system comprises a detecting unit, an output unit, and a processing unit. The detecting unit is configured to detect objects in a surrounding of the first vehicle, and the output unit is configured to output information to the driver of the vehicle. The processing unit coupled to the detecting unit and the output unit is configured to detect if the first vehicle is located in a blind spot area of a second vehicle. This detection may be based on the detected objects in the surrounding of the first vehicle. If the processing unit has detected that the first vehicle is located in the blind spot area of the second vehicle, an information is output to a driver of the first vehicle via the output unit. The information indicates that a blind spot situation is present. Thus, the driver of the first vehicle may be warned that the first vehicle resides in the blind spot area of another vehicle and may maneuver the first vehicle out of this area to avoid a collision with the other vehicle when the other vehicle is changing the lane.

According to another aspect of the present invention a driver assistance system for assisting a driver driving a first vehicle comprises a detecting unit, an output unit, a speed control unit, and a processing unit. The detecting unit is configured to detect objects in a surrounding of the first vehicle. The output unit is configured to output information to the driver of the first vehicle, and the speed control unit is configured to control a speed of the first vehicle. The speed control unit may be comprised by an adaptive cruise control system of the vehicle. The processing unit is coupled to the detecting unit, the output unit and the speed control unit. The processing unit may be part of the adaptive cruise control system. The processing unit is configured to detect if one vehicle of the first vehicle and a second vehicle is located in a blind spot area of the other vehicle of the first vehicle and the second vehicle. The detection is based on the detected objects in the surrounding of the first vehicle. If the processing unit has detected that the one vehicle is located in the blind spot area of the other vehicle, the processing unit controls the speed control unit to vary the speed of the first vehicle and outputs via the output unit an information indicating that the speed of the first vehicle has been varied due to a detected blind spot situation.

The driver assistance system may help to avoid a situation in which the one vehicle is in the blind spot area of the other vehicle which may be dangerous in case of a lane change. By indicating that the speed of the vehicle has been varied for avoiding a blind spot situation, this may help the driver to understand the behavior of the driver assistance system or the adaptive cruise control system, making the experience more comfortable.

According to another embodiment, the processing unit is furthermore configured to output an information which indicates that the blind spot situation in general is present. This may increase the attention of the driver in case of a blind spot situation.

According to another embodiment, the processing unit may detect an amount of time the blind spot situation is lasting, and to vary the speed of the first vehicle only, if the detected amount of time exceeds a predetermined amount of time. This may avoid a frequent variation of the speed of the first vehicle in situations like passing another vehicle in an adjacent lane.

Furthermore, the processing unit may detect a speed difference between a speed of the one vehicle and the speed of the other vehicle, and vary the speed of the first vehicle only, if the detected speed difference is below a predetermined threshold.

According to another embodiment, the processing unit is configured to accelerate the first vehicle with a predetermined amount of acceleration, or to decelerate the first vehicle with a predetermined amount of deceleration. The amount of acceleration and the amount of deceleration are different. In case the first vehicle and the second vehicle are both equipped with the described driver assistance system, the different acceleration and deceleration may help to avoid that both vehicles are varying their speed in the same manner to avoid the blind spot situation, but due to the same behavior they cannot resolve the blind spot situation.

According to an embodiment, the detecting unit may comprise a camera, a distance sensor, a radar device, a laser range finder, an ultra-sound distance sensor, an infrared distance finder, or a combination of the above-listed components. In case the one vehicle is the first vehicle and the other vehicle is the second vehicle, the detecting unit is arranged and configured such that it may monitor an area on a neighboring lane beside and in front of the first vehicle. Thus, the processing unit may monitor this area and may detect, if a driver position of the second vehicle resides in a predetermined area on the neighboring lane beside and in front of the first vehicle. In case the other vehicle is the first vehicle and the one vehicle is the second vehicle, the detecting unit may be arranged such that it is configured to monitor an area on a neighboring lane beside and behind the first vehicle and the processing unit may be configured to monitor this area on the neighboring lane beside and behind the first vehicle, and to detect, if the second vehicle resides in a predetermined area on the neighboring lane beside and behind the first vehicle. Thus, blind spot situations may be reliably detected.

According to another embodiment, the processing unit is configured to detect the distance between a current position of the first vehicle and a blind spot position in which the first vehicle is located in the blind spot situation. Based on this detection, the processing unit may output an information indicating the distance. This information may warn the driver that the first vehicle is approaching a blind spot situation and may increase the attention of the driver or may cause the driver to get out of this situation. The information indicating that the blind spot situation is present or a blind spot situation is approaching may comprise an audio signal, an optical signal, a tactile signal, or a combination of the signals listed above. Furthermore, the kind of signal or an intensity of the signal may be varied due to the severity or distance of the blind spot situation.

According to another embodiment of the present invention, a vehicle comprising the above-described driver assistance system is provided.

The above-described exemplary embodiments will now be described in more detail with reference to the accompanying drawings.

Figure 3:
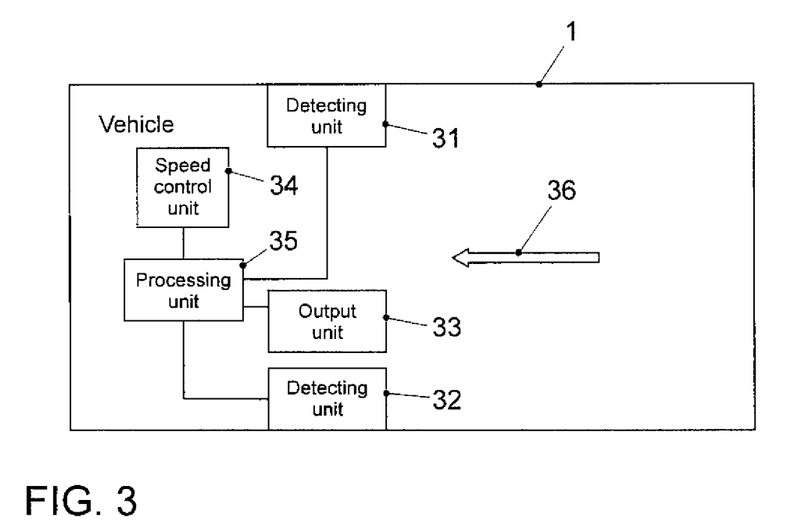
FIG. 3 shows schematically a vehicle according to an embodiment of the present invention.

FIG. 3 shows a vehicle 1 comprising a first detecting unit 31, a second detecting unit 32, an output unit 33, a speed control unit 34, and a processing unit 35. Assuming the vehicle 1 is driving forwards in the direction of arrow 36, the first detecting unit 31 may be adapted to monitor an area on the right-hand side of the vehicle 1, and the second detecting unit 32 may be adapted to monitor an area on the left-hand side of the vehicle 1. More specifically, the first detecting unit 31 may be adapted to detect if another vehicle is driving in the blind spot area of the vehicle 1 on a neighboring lane on the right-hand side of the vehicle 1. Such a blind spot area of the vehicle 1 on the right-hand side is indicated as area 25 in FIG. 2. Furthermore, the first detecting unit 31 may be adapted to monitor an area on the neighboring lane on the right-hand side in front of the vehicle to detect if the vehicle 1 is within a blind spot area of another vehicle on the neighboring lane on the right-hand side. In the same way, the second detecting unit 32 may be adapted to monitor vehicles on a neighboring lane on the left-hand side of the vehicle, and to detect if another vehicle is in the blind spot area of the vehicle 1 as indicated by area 24 in FIG. 2, or if the vehicle 1 itself is within a blind spot area of another vehicle on the neighboring lane on the left-hand side. The detecting unit as defined in the appended claims may comprise the first detecting unit 31 and/or the second detecting unit 32.

The processing unit 35 which is coupled to the detecting units 31, 32, the output unit 33 and the speed control unit 34, analyzes the information from the detecting units 31, 32 and determines, if a blind spot situation in which either the vehicle 1 is located within a blind spot area of another vehicle or another vehicle is located within the blind spot area of the vehicle 1, is present. In case a blind spot situation is detected, the processing unit 35 may output an information to the driver via the output unit 33 indicating that a blind spot situation is present. Furthermore, the processing unit 35 may control the speed control unit 34 such that the speed of the vehicle 1 is varied to resolve the blind spot situation.

Figure 4:
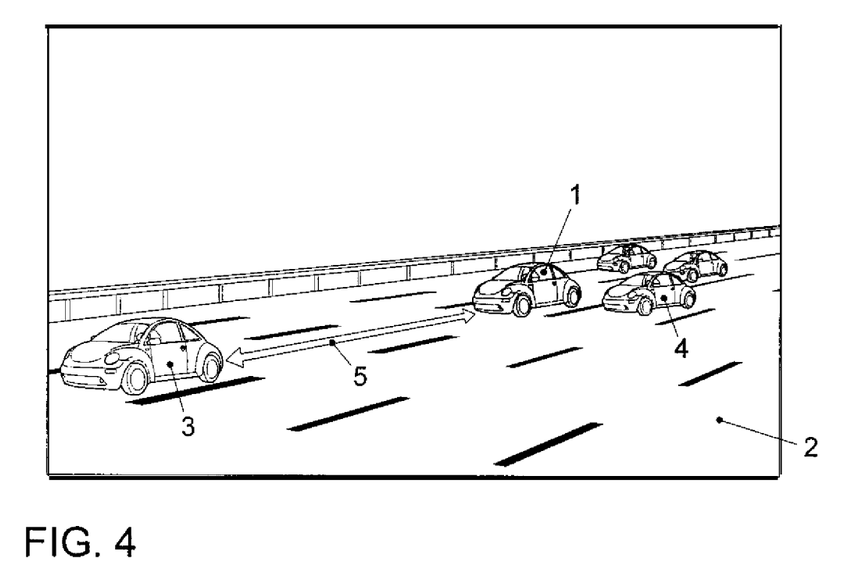
FIG. 4 shows another situation on the road of FIG. 1.

For example, if the vehicle 1 is located in a blind spot area of another vehicle 4 as indicated in FIG. 1, the processing unit 35 may vary the speed of the vehicle 1 or vary the distance 5 between vehicle 1 and the vehicle 3 of FIG. 2 to get the vehicle 1 out of the blind spot situation. For example, vehicle 1 may accelerate and pass vehicle 4 to resolve the blind spot situation, as shown in FIG. 4. In FIG. 4 the vehicle 1 has passed the vehicle 4 by accelerating and decreasing the distance 5 to the vehicle 3 driving in front of vehicle 1. Thus, the blind spot situation of FIG. 1 is resolved in FIG. 4.

Figure 5:
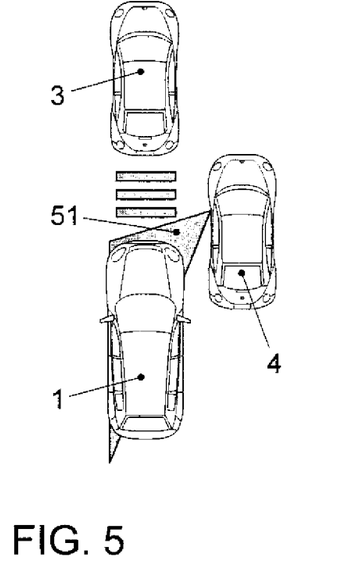
FIGS. 5 and 6 show schematically an avoidance of a blind spot situation according to an embodiment of the method of the present invention.
Figure 6:
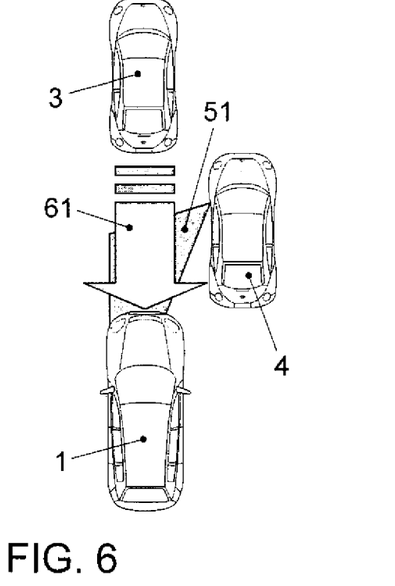

FIG. 5 shows a situation in which a vehicle 1 is driving behind a leading vehicle 3. The vehicle 1 may be controlled by an adaptive cruise control system to drive at a constant distance behind vehicle 3. However, a situation may occur in which another vehicle 4 is present right in front of the vehicle 1 on a neighboring lane. Furthermore, due to the constant distance between the vehicle 1 and the leading vehicle 3, the adaptive cruise control system may drive the vehicle 1 into a blind spot area 51 of vehicle 4. This blind spot situation is detected automatically by the processing unit 35 and to avoid this blind spot situation, the processing unit 35 may control the speed control unit 34 of the adaptive cruise control system to decrease the speed of vehicle 1 or to increase the distance between vehicle 1 and vehicle 3 such that vehicle 1 gets out of the blind spot area 51. As shown in FIG. 6 by the arrow 61, the distance between the vehicle 1 and the vehicle 3 is increased such that the vehicle 1 does not reside in the blind spot area 51 of vehicle 4 anymore.

Figure 7:
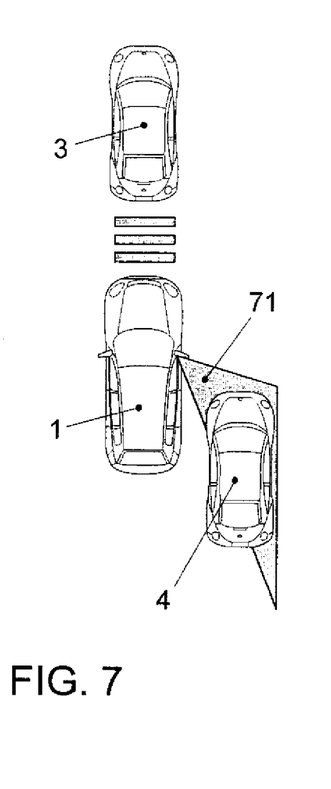
FIGS. 7 and 8 show another method for avoiding a blind spot situation according to an embodiment of the present invention.
Figure 8:
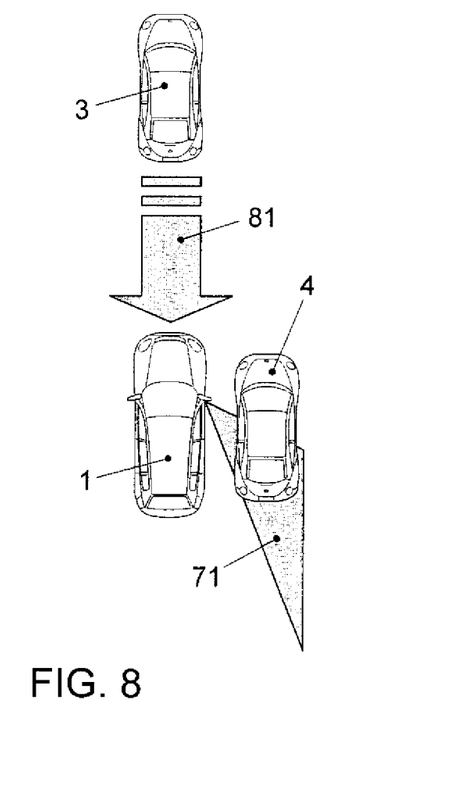
Figure 9:
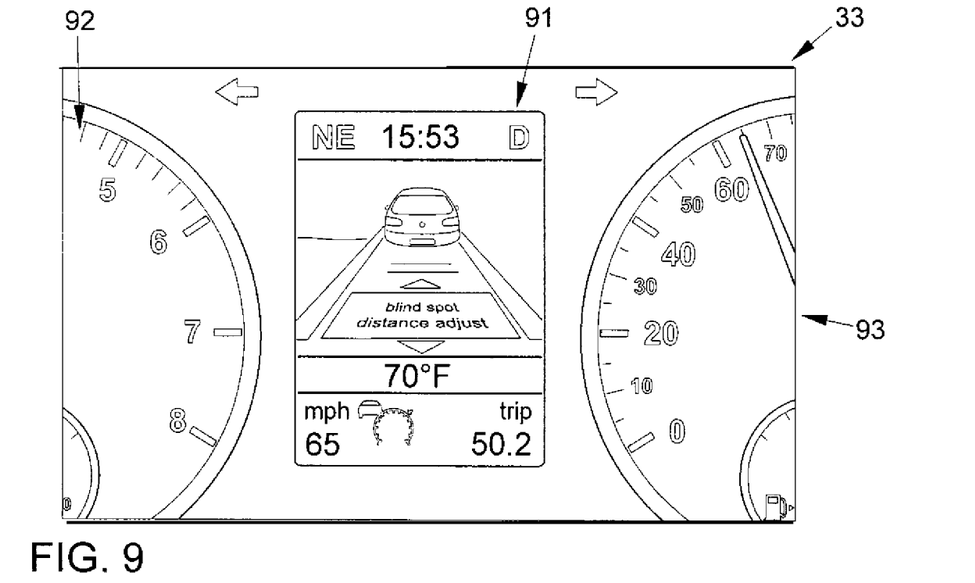
FIG. 9 shows schematically an output to a driver of a vehicle according to an embodiment of the present invention.

FIG. 7 shows another situation in which vehicle 1 is driving behind the leading vehicle 3 at a constant distance controlled by an adaptive cruise control system. However, it may occur that in the blind spot area 71 of vehicle 1 another vehicle 4 may be present. The processing unit 35 of vehicle 1 may detect that the other vehicle 4 is located within the blind spot area 71 of vehicle 1 and due to this detection the processing unit 35 may decelerate vehicle 1 thus increasing the distance between vehicle 1 the leading vehicle 3 as indicated by arrow 81 in FIG. 8. By decreasing the speed of vehicle 1 the other vehicle 4 is getting out of the blind spot area 71 and is now visible to a driver of vehicle 1. Thus, the blind spot situation is resolved and a collision between vehicles 1 and 4 due to a lane change may be avoided. As the driver of vehicle 1 does presumably not know that the other vehicle 4 is located within the blind spot area 71 of vehicle 1, the driver may be irritated when the adaptive cruise control system increases the distance between vehicle 1 and the leading vehicle 3. Therefore, the processing unit 35 may output an information to the driver via the output unit 33. The output unit 33 may comprise for example a dash board of the vehicle as indicated in FIG. 9. On a display 91 of the dash board 33 an indication that a blind spot distance adjustment takes place may be output as shown in FIG. 9. The dash board 33 may comprise additional instruments, for example a revolution counter 92, a tachometer 93 and so on, as shown in FIG. 9.

Figure 10:
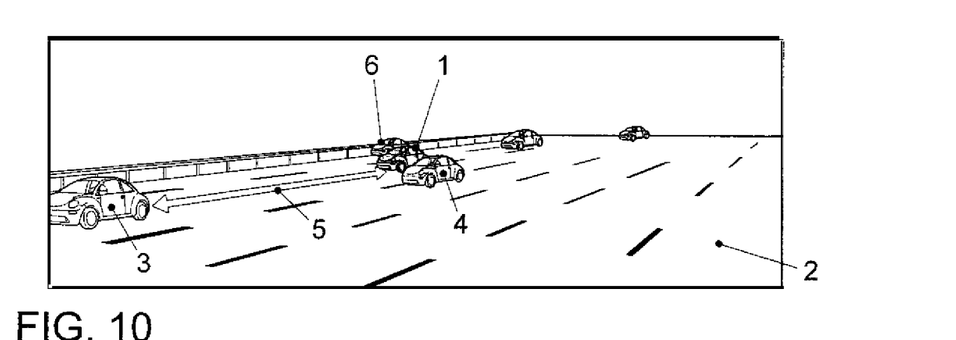
FIG. 10 shows schematically a road with vehicles in a blind spot situation.
Figure 11:
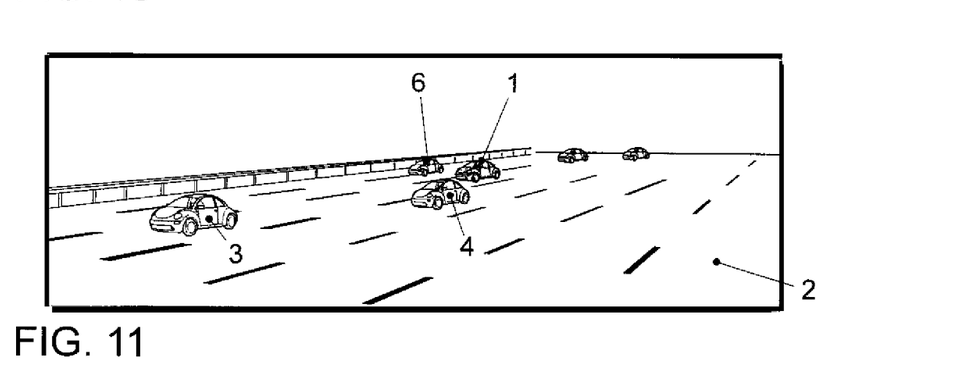
FIG. 11 shows another situation of the vehicles of FIG. 10.

FIG. 10 shows another situation on a road 2 comprising several lanes. A vehicle 1 which is equipped with the driver assistance system as explained in connection with FIG. 3, is driving on a central lane for example under the control of an adaptive cruise control system following a leading vehicle 3 at a constant distance 5. On a neighboring lane on the left-hand side of the vehicle 1 another vehicle 4 is driving slightly in front of vehicle 1. Furthermore, a further vehicle 6 is driving on a neighboring lane on the right-hand side of vehicle 1 slightly behind vehicle 1. In the situation shown in FIG. 10, vehicle 1 may be located in a blind spot area of vehicle 4 and at the same time vehicle 6 may be located in a blind spot area of vehicle 1. To avoid these blind spot situations, vehicle 1 may accelerate or decelerate. In case vehicle 1 would accelerate, the blind spot situation between vehicle 1 and vehicle 6 may be resolved, but another blind spot situation between vehicles 1 and 4 may occur and furthermore the distance 5 to the leading vehicle may be decreased such that a safety distance may be underrun. Therefore, as shown in FIG. 11, vehicle 1 decelerates thus resolving both blind spot situations and keeping a safe distance to leading vehicle 3.

While exemplary embodiments have been described above, various modifications may be implemented in other embodiments. For example, on the display 91 of the dash board 33 of the vehicle 1, an information may be output to the driver of the vehicle when the vehicle resides in a blind spot area of another vehicle or if another vehicle resides in a blind spot area of vehicle 1. Furthermore, a location where the blind spot situation is occurring, for example on the right-hand side or on the left-hand side, may be indicated on the display 91.

Finally, it is to be understood that all the embodiments described above are considered to be comprised by the present invention as it is defined by the appended claims.

What is claimed is:

1. A method for assisting a driver driving a first vehicle, the method comprising:
    monitoring to detect if one vehicle of the first vehicle and a second vehicle is located in a blind spot area of the other vehicle of the first vehicle and the second vehicle, and
    if it is detected that the one vehicle is located in the blind spot area of the other vehicle,
    outputting an information to the driver of the first vehicle indicating that a blind spot situation is present,
    detecting an amount of time the blind spot situation has existed, and
    automatically varying the speed of the first vehicle only, if the detected amount of time exceeds a predetermined amount of time.

2. The method of claim 1, further comprising outputting information to the driver of the first vehicle indicating that the blind spot is present if the one vehicle is detected as being located in the blind spot area of the other vehicle.

3. The method of claim 1, wherein the automatically varying the speed of the first vehicle further comprises:
    detecting a speed difference between a speed of the one vehicle and a speed of the other vehicle, and
    automatically varying the speed of the first vehicle only, if the detected speed difference is below a predetermined threshold value.

4. The method of claim 1, wherein automatically varying the speed of the first vehicle comprises accelerating the first vehicle with a predetermined amount of acceleration, or decelerating the first vehicle with a predetermined amount of deceleration, wherein the amount of acceleration and the amount of deceleration are different.

5. The method of claim 1, wherein the one vehicle is the first vehicle and the a other vehicle is the second vehicle, and wherein;
    detecting if the one vehicle is located in the blind spot area of the other vehicle comprises:
        monitoring an area on a neighboring lane beside and in front of the first vehicle, and
        detecting, if a driver position of the second vehicle resides in a predetermined area on the neighboring lane beside and in front of the first vehicle.

6. The method of claim 1, wherein the other vehicle is the first vehicle and the one vehicle is the second vehicle, and wherein detecting if the one vehicle is located in the blind spot area of the other vehicle comprises:
    monitoring an area on a neighboring lane beside and behind the first vehicle, and detecting, if the second vehicle resides in a predetermined area on the neighboring lane beside and behind the first vehicle.

7. The method of claim 1, further comprising:
    detecting a distance between a current position of the first vehicle and a blind spot position in which the first vehicle is located in the blind spot situation, and
    outputting to the driver of the first vehicle an information indicating the distance.

8. The method of claim 1, wherein outputting the information indicating that the blind spot situation is present comprises outputting an information selected from an audio signal, an optical signal and a tactile signal.

9. The method of claim 1, wherein detecting if the one vehicle is located in the blind spot area of the other vehicle comprises:
    detecting objects in a surrounding of the first vehicle with a detecting unit, and
    detecting if the one vehicle is located in the blind spot area of the other vehicle depending on the detected objects in the surrounding of the first vehicle.

10. The method claim 9, wherein the detecting unit comprises at least one of a camera, a distance sensor, a radar device, a laser range finder, an ultra sound distance sensor, and an infra red distance finder.

11. A driver assistance system for assisting a driver driving a first vehicle, the system comprising:
    a detecting unit to detect objects in a surrounding of the first vehicle,
    an output unit to output information to the driver of the first vehicle,
    a speed control unit to control a speed of the first vehicle, and
    a processing unit coupled to the detecting unit, the output unit, and the speed control unit, the processing unit being provided to:
        detect if one vehicle of the first vehicle and a second vehicle is located in a blind spot area of the other vehicle of the first vehicle and the second vehicle depending on the detected objects in the surrounding of the first vehicle, and, if it is detected that the one vehicle is located in the blind spot area of the other vehicle, to output an information to the driver of the first vehicle indicating that a blind spot situation is present,
        detect an amount of time the blind spot situation has existed, and
        vary the speed of the first vehicle if the detected amount of time exceeds a predetermined amount of time.

12. The system of claim 11, wherein the processing unit is further provided to output an information indicating that the blind spot situation is present.

13. The system of claim 11, wherein the processing unit is further provided to detect an amount of time the blind spot situation has existed, and to vary the speed of the first vehicle only, if the detected amount of time exceeds a predetermined amount of time.

14. The system of claim 11, wherein the processing unit is further provided to detect a speed difference between a speed of the one vehicle and a speed of the other vehicle, and to vary the speed of the first vehicle only, if the detected speed difference is below a predetermined threshold value.

15. The system of claim 11, wherein the processing unit is further provided to accelerate the first vehicle with a predetermined amount of acceleration, or to decelerate the first vehicle with a predetermined amount of deceleration, wherein the amount of acceleration and the amount of deceleration are different.

16. The system of claim 11, wherein the one vehicle is the first vehicle and the other vehicle is the second vehicle, and wherein the processing unit is further provided to monitor an area on a neighboring lane beside and in front of the first vehicle, and to detect, if a driver position of the second vehicle resides in a predetermined area on the neighboring lane beside and in front of the first vehicle.

17. The system of claim 11, wherein the other vehicle is the first vehicle and the one vehicle is the second vehicle, and wherein the processing unit is further provided to:
    monitor an area on a neighboring lane beside and behind the first vehicle, and detect if the second vehicle resides in a predetermined area on the neighboring lane beside and behind the first vehicle.

18. The system of claim 11, wherein the processing unit is further provided to detect a distance between a current position of the first vehicle and a blind spot position in which the first vehicle is located in the blind spot situation, and to output an information indicating the distance.

19. The system of claim 11, wherein the information indicating that the blind spot situation is present comprises an audio signal, an optical signal and a tactile signal.

20. The system of claim 11, wherein the detecting unit comprises at least one of a camera, a distance sensor, a radar device, a laser range finder, an ultra sound distance sensor, and an infra red distance finder.

21. A vehicle comprising the driver assistance system, comprising:
    a detecting unit to detect objects in a surrounding of the first vehicle,
    an output unit to output information to the driver of the first vehicle,
    a speed control unit to control a speed of the first vehicle, and
    a processing unit coupled to the detecting unit, the output unit, and the speed control unit, the processing unit being provided to:
        detect if one vehicle of the first vehicle and a second vehicle is located in a blind spot area of the other vehicle of the first vehicle and the second vehicle depending on the detected objects in the surrounding of the first vehicle, and, if it is detected that the one vehicle is located in the blind spot area of the other vehicle, to output an information to the driver of the first vehicle indicating that a blind spot situation is present,
        detect an amount of time the blind spot situation has existed, and
        vary the speed of the first vehicle if the detected amount of time exceeds a predetermined amount of time.

* * * * *